(12) United States Patent
Wagle et al.

(10) Patent No.: US 9,296,941 B2
(45) Date of Patent: Mar. 29, 2016

(54) INVERT EMULSION GRAVEL PACK FLUID AND METHOD

(71) Applicant: Halliburton Energy Services, Inc., Houston, TX (US)

(72) Inventors: Vikrant Bhavanishankar Wagle, Mumbai (IN); Dhanashree Gajanan Kulkarni, Pune (IN)

(73) Assignee: Halliburton Energy Services, Inc., Houston, TX (US)

( * ) Notice: Subject to any disclaimer, the term of this patent is extended or adjusted under 35 U.S.C. 154(b) by 376 days.

(21) Appl. No.: 13/763,615

(22) Filed: Feb. 8, 2013

(65) Prior Publication Data

US 2014/0224485 A1    Aug. 14, 2014

(51) Int. Cl.
 *C09K 8/565* (2006.01)
 *C09K 8/36* (2006.01)
 *E21B 43/04* (2006.01)

(52) U.S. Cl.
 CPC . *C09K 8/565* (2013.01); *C09K 8/36* (2013.01); *E21B 43/04* (2013.01)

(58) Field of Classification Search
 None
 See application file for complete search history.

(56) References Cited

U.S. PATENT DOCUMENTS

| 4,460,627 | A | * | 7/1984 | Weaver et al. | 427/212 |
| 2001/0036905 | A1 | * | 11/2001 | Parlar et al. | 507/200 |
| 2006/0272815 | A1 | | 12/2006 | Jones et al. | |
| 2011/0214864 | A1 | * | 9/2011 | Maghrabi et al. | 166/294 |
| 2013/0020081 | A1 | * | 1/2013 | Maghrabi et al. | 166/279 |

OTHER PUBLICATIONS

Formulation Freedom, 18 Adhesives and Sealants Industry 11, Nov. 2011, p. 29.*
Halliburton Product Data Sheet, "Baracarb® Bridging Agent" 2010.*
Examination Report in related Brunei patent application No. BN/N/2014/0007, mailed Oct. 22, 2015 (9 pages).

* cited by examiner

*Primary Examiner* — Angela M DiTrani
*Assistant Examiner* — Anuradha Ahuja
(74) *Attorney, Agent, or Firm* — Holly Soehnge; Baker Botts L.L.P.

(57) ABSTRACT

A gravel packing fluid and method for brine-sensitive formations. The fluid comprises an invert oil emulsion compatible with oil based drilling fluids and having a suspension agent comprising polyurea and dimer diamine. The fluid is capable of carrying gravel yet has a viscosity less than 100 cp, often eliminating the need for an emulsion breaker during flowback of the fluid to the well surface after deposition of gravel in the well.

13 Claims, No Drawings

INVERT EMULSION GRAVEL PACK FLUID AND METHOD

BACKGROUND OF THE INVENTION

1. Field of the Invention

This invention generally relates to compositions and methods or processes for gravel packing and sand control in wells drilled in subterranean hydrocarbon-bearing formations, including without limitation horizontal and directional wells. This invention is particularly advantageous for use in water sensitive formations.

2. Description of Relevant Art

As used herein, the terms "gravel pack fluid," "gravel packing fluid," or "carrier fluid," which may be used interchangeably herein, shall be understood to mean a fluid used for sand control, gravel packing, and workover operations, as well as a fluid employed as a packer fluid. The term "gravel" shall be understood to include not only natural gravel but other proppant type materials, natural and man made or synthetic, such as, for example, sand, pebbles, and synthetic beads. Generally, the well's bottom hole pressure, which must be equalized, determines the minimal density of the fluid needed. The term "solids-free" as applied to the basic gravel pack fluid shall be understood to mean that no solid materials (e.g., weighting agents or commercial particulates) are present in the fluid (except that the term is not intended to exclude the presence of drill cuttings in the fluid in the well). The term "horizontal" with respect to a wellbore or to drilling shall be understood to mean at an angle or incline other than 90 degrees from the wellbore surface as the surface is viewed as a horizontal plane at ground level. The term "brine-sensitive formation" shall be understood to mean a formation sensitive to brines or that is best suited for oil-based drilling and packer fluids, such as a formation having swelling or sloughing shales, salt, gypsum, anhydrite or other evaporite formation, a hydrogen-sulfide containing formation and hot (greater than 300 degrees Fahrenheit) holes.

During the drilling of a wellbore, various fluids are typically used in the well for a variety of functions. The fluids may be circulated through a drill pipe and drill bit into the wellbore, and then may subsequently flow upward through the wellbore to the surface. Common uses for well fluids include: lubrication and cooling of drill bit cutting surfaces while drilling generally or drilling-in (i.e., drilling in a targeted payzone or petroliferous formation), transportation of "cuttings" (pieces of formation dislodged by the cutting action of the teeth on a drill bit) to the surface, controlling formation fluid pressure to prevent blowouts, maintaining well stability, suspending solids in the well, minimizing fluid loss into and stabilizing the formation through which the well is being drilled, fracturing the formation in the vicinity of the well, displacing the fluid within the well with another fluid, cleaning the well, testing the well, transmitting hydraulic horsepower to the drill bit, emplacing a packer, abandoning the well or preparing the well for abandonment, and otherwise treating the well or the formation.

Once the well has been drilled and a hydrocarbon reservoir has been encountered, the well is ready to be completed. In the course of completing a well, it is common practice to run a string of casing into the well bore and then to run the production tubing inside the casing. At the producing interval(s) of the formation, perforations are typically created to extend through the casing string, through the cement that secures the casing string in place, and a short distance into the formation. These perforations may be created by detonating shaped charges carried in a perforating gun. The perforations created cross one or more production zones to allow production fluids to enter the interior of the wellbore.

After the well is cased and perforated, a stimulation or sand control treatment process may be performed. Sand control processes may prevent, after the well is completed and placed in production, formation sand from unconsolidated formations being swept into the flow path along with formation fluid, which erodes production components in the flow path. Similarly, in uncased boreholes, where an open face is established across the oil or gas bearing zone, formation sand from unconsolidated formations may also be swept into the flow path along with formation fluid.

Thus, with either cased or uncased well bores, one or more sand screens may be installed in the flow path between the production tubing and the rock face in the producing reservoir. Additionally, the annulus around the screen may be packed with a relatively coarse sand or gravel into the void between the reservoir rock and the outside of the screen, so as to act as a filter to reduce the amount of line formation sand reaching the screen, to support the porous medium of the producing reservoir so that it will not collapse into the void between the reservoir rock and the outside of the screen, and to seal off the annulus in the producing zone from non-producing formations. When the sand tries to move through the gravel, it is filtered and held back by the gravel and/or screen, but formation fluids continue to flow unhindered (by either the gravel or screen) into the production string.

In deep wells, reliability of the sand face completion is very important, due to the prohibitively high cost of intervention. Further, as many such wells are completed open hole and in relatively incompetent rock, gravel packing of open-hole horizontal wells is increasingly becoming a standard practice in the deep-water, sub-sea completion environment. The gravel packing process involves mixing gravel with a carrier fluid, and pumping the slurry down the tubing and through the cross-over, thereby flowing into the annulus between the screen and the wellbore. The carrier fluid in the slurry leaks off into the formation and/or through the screen. The screen is designed to prevent the gravel in the slurry from flowing through it and entering the production tubing. As a result, the gravel is deposited in the annulus around the screen where it becomes tightly packed, forming a "gravel pack." Thus, gravel is deposited adjacent an open hole where it serves to prevent sand and other formation fines from flowing into the wellbore.

Proper selection of the carrier fluid is essential to a gravel packing process. Ideally, the carrier fluid shall not cause any permeability reduction of the formation. When viscous fluids are used, carrier fluid must also have sufficient viscosity to suspend and carry the gravel during placement. Carrier fluids are either considered "water-based" or "oil-based" depending on the constituency of their external continuous phase. Aqueous-based fluids can be tailored to be compatible with many formations simply by including salts such as, for example, potassium chloride, ammonium chloride, or tetramethyl ammonium chloride. Consequently, to date, the convention in gravel-packing horizontal wells has been water packing or shunt-packing with water-based viscous fluids comprising a brine, a gelling agent such as, for example, hydroxyethylcellulose (HEC), xanthan or a viscoelastic surfactant, and breakers to minimize the pressure required to move the fluid back to the wellbore.

However, when a well has been drilled with an oil or synthetic-based drilling fluid, aqueous based fluids can be incompatible with the drilling fluid or with the subterranean formation having characteristics that necessitated the use of the oil or synthetic-based drilling fluid such as a brine— sensitive formation. Clean hydrocarbon oils would likely provide the most compatible or least damaging completion fluids, but such oils do not have the required densities and do not readily dissolve compounds that could provide the required densities. Invert emulsion based gravel pack fluids have been used with a typical oil:water ratio of 30:70 (i.e., the oil content being less than the brine content). While these fluids are sufficiently viscous to carry the gravel, they have the disadvantage of necessitating the breaking of the emulsion to lower the viscosity of the fluid during flow-back, that is, to lower the viscosity so the fluid can return to the surface after depositing the gravel or other gravel packing material.

Accordingly, there exists a continuing need for developments in carrier fluids for gravel packing processes.

SUMMARY OF THE INVENTION

The present invention provides a gravel packing or carrier fluid and gravel packing method particularly suited for wells drilled with a natural or synthetic oil based drilling mud. The carrier fluid comprises an oleaginous continuous phase, an aqueous discontinuous phase and a suspension agent comprising a dimer diamine viscosifier and a polyurea. The carrier fluid has a viscosity less than 100 cp, and in one embodiment less than 40 cp, yet is still able to suspend gravel for gravel packing. This low viscosity also enables the carrier fluid to easily flow-back to the well surface after deposition of the gravel in the well, often without an emulsion breaker. The carrier fluid may also be used to carry particulates other than gravel for well treatments other than gravel packing.

DETAILED DESCRIPTION OF PREFERRED EMBODIMENTS

The present invention provides an improved oil-based gravel packing fluid and method employing water-in-oil emulsions, also called invert emulsions, as the carrier fluid for the gravel. This fluid of the invention is especially useful for horizontal wells and wells penetrating brine-sensitive formations. The fluid may also be used as a carrier fluid for particulates for well treatments involving particulates other than gravel packing.

The internal phase of the emulsion of the fluid of the invention comprises a brine and the external phase of the emulsion comprises natural or synthetic oil that is preferably compatible with oil or synthetic-based drilling fluids. An emulsifier blended with the brine and the oil facilitates formation of the emulsion. The brine portion of the emulsion dissolves salts to enhance and control the density of the fluid, while the oil portion of the emulsion allows for compatibility with oil-based drilling fluids and with brine-sensitive formations.

Various quantities of natural or synthetic oil and water or brine may be used, so long as an invert (water-in-oil) emulsion is created and the rheology of the fluid is suitable for gravel packing. The oil to water ratio (OWR) of the emulsion for the invention is in the range of 30:70 to 90:10. In one embodiment, the ratio is skewed to more oil than water, such as for nonlimiting example, 70:30. In another embodiment, the ratio may have a higher water content, such as for nonlimiting example, 30:70. Higher water to oil content imparts higher viscosity to the fluid. The quantity of emulsifier used is an amount sufficient to facilitate formation of the emulsion. Generally, about 5 to about 20 pounds of emulsifier per barrel are sufficient.

Most preferably, filtered brine or "clear brine" is used for the emulsion. The parameters used in selecting the brine also depend in part on the density that is required of the gravel pack carrier fluid in a given well as will be further discussed below. Brines that may be used in the present invention can comprise $CaCl_2$, $CaBr_2$, NaBr, NaCl, KCl, potassium formate, ZnBr or cesium formate, among others set forth in Table 1 below. Brines that comprise $CaCl_2$, $CaBr_2$, and potassium formate are particularly preferred in embodiments calling for high densities.

Preferred oils for the emulsion are synthetic oils such as olefins, n-paraffins, iso-paraffins, n-alkanes, cyclic alkanes, branched alkanes, esters, and mixtures thereof and some natural oils such as crude oils (preferably diesels and lighter crude oils) and distilled hydrocarbons, and mixtures thereof. Preferred emulsifiers comprise polyaminated fatty acid, polyolefin amides and alkeneamides. Other oil wetting ionic surfactants might also be used for an emulsifer in some embodiments. Preferably, the emulsifier will be relatively passive, stable at temperatures as high as 400 degrees Fahrenheit, and suitable for use with a wide variety of oils, synthetics and produced crudes (or crude oils).

Preferred densities of salts in the emulsions may be determined or controlled by the quantity of halide salt added to the brine and the particular halide chosen. Generally, the more salt added, the greater the density, and the heavier the salt added (depending on its composition), the greater the density. For example, preferably about 10 to 15 or more pounds of calcium chloride or calcium bromide or zinc bromide per gallon of gravel pack fluid may be used for the invention, while up to or about 20 or more pounds of cesium formate per gallon of gravel pack fluid may alternatively be used. Preferably the gravel pack fluids of the invention have a density that is sufficient to allow the fluid to control the well during well completion operations, since open-hole gravel packing is done almost exclusively in circulating position. Typical fluid densities for the gravel pack fluids are from about 8.8 ppg (pounds per gallon) up to about 19.2 ppg, more preferably about 8.8 ppg up to 14.2 ppg. The desired density of the fluid will depend on the pore pressure and fracture gradient in the formation. General density ranges for clear brine fluids are set forth in Table 1 below.

TABLE 1

General Density Ranges for Clear Brine Fluids

| Clear Brine Fluid | Density Range lb/gal |
|---|---|
| Ammonium Chloride, $NH_4Cl$ | 8.4-8.9 |
| Potassium Chloride, KCl | 8.4-9.7 |
| Potassium-Sodium Chloride, KCl/NaCl | 8.4-10.0 |
| Sodium Chloride, NaCl | 8.4-10.0 |
| Sodium Formate, $NaO_2CH$ | 8.4-11.1 |
| Potassium-Calcium Chloride, $KCl/CaCl_2$ | 8.4-11.6 |
| Calcium Chloride, $CaCl_2$ | 8.4-11.6 |
| Sodium Bromide, NaBr | 8.4-12.7 |
| Sodium Bromide-Chloride, NaBr/NaCl | 8.4-12.7 |
| Potassium Formate, $KO_2CH$ | 8.4-13.1 |
| Calcium Bromide, $CaBr_2$ | 8.4-15.1 |
| Calcium Chloride-Bromide, $CaCl_2/CaBr_2$ | 11.6-15.1 |
| Potassium-Cesium Formate, $KO_2CH/CsO_2CH$ | 13.1-19.2 |
| Cesium Formate, $CsO_2CH$ | 13.1-19.2 |
| Zinc Bromide, $ZnBr_2$ | 15.2-20.5 |
| Zinc-Calcium Bromide, $ZnBr_2/CaBr_2$ | 15.0-20.5 |
| Zinc-Calcium Bromide-Chloride, $ZnBr_2/CaBr_2/CaCl_2$ | 15.0-19.2 |

The gravel packing fluid of the invention further comprises a suspension agent comprising a combination of a dimer diamine (or fatty acid dimer diamine) and polyurea. A commercially available non-limiting example polyurea compound for the invention is ADDITIN™ M10.411, available from Rhein Chemie. Preferred commercially available hydrophobic dimer amines suitable for use in the present invention include without limitation VERSAMINE® 552 hydrogenated fatty C36 dimer diamine, and VERSAMINE® 551 fatty C36 dimer diamine, both available from Cognis Corporation (functional products) of Monheim, Germany and Cincinnati, Ohio, and PRIAMINE™ 1074, available from Croda Chemicals. These fatty dimer diamines are prepared commercially from fatty dimer diacids which have been produced from dimerisation of vegetable oleic acid or tall oil fatty acid by thermal or acid catalyzed methods.

In one embodiment, the dimer amine used in the present invention is a C36 fatty dimer diamine having the following molecular structure:

In one embodiment, a preferred commercially available C36 dimer diamine contains C18 fatty monoamine and C54 fatty trimer triamine which are obtained during the commercial production of the dimer diamine. The dimerisation of C18 tall oil fatty acids produces the material leading to the C36 dimer acids. This material is a mixture of monocyclic dicarboxylic acid, acyclic dicarboxylic acid and bicyclic dicarboxylic acid along with small quantities of trimeric triacids. These diacids are converted into diamines via the reaction scheme given below:

Reaction Scheme I.

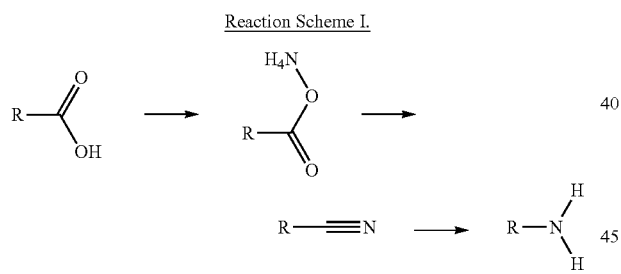

These diamines are further converted into compounds that fall under the scope of hydrophobic amine additives. These diamines are converted into cyanoethyl derivatives via cyanoethylation with acrylonitrile; these cyanoethyl derivatives are further reduced into aminopropyl amines via reduction as shown in the reaction scheme II below, as taught in U.S. Pat. No. 4,250,045, issued Feb. 10, 1981 to Coupland, et al.

Reaction Scheme II

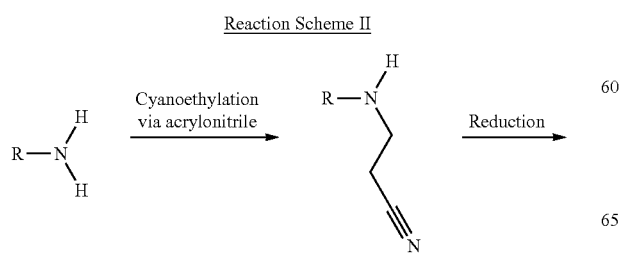

Dicyanoethylated dimer diamine is available commercially as Kemamine DC 3680 and 3695 and di N-aminopropylated dimer diamine is available commercially as Kemamine DD 3680 and 3695 from Chemtura Corporation USA. Different structures of the dimeric hydrophobic amine additives are given below:

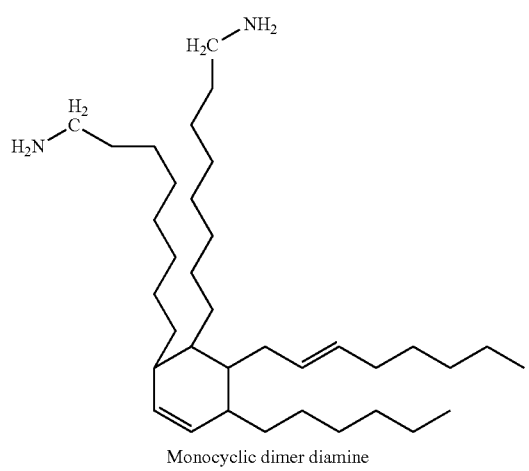

Monocyclic dimer diamine

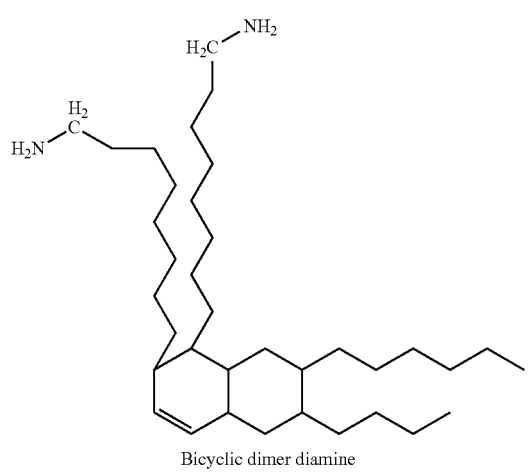

Bicyclic dimer diamine

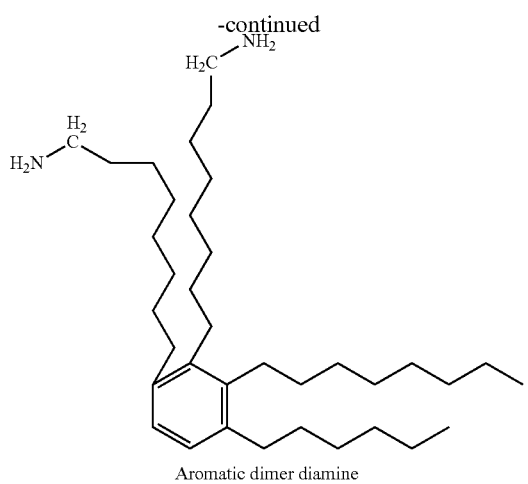

Aromatic dimer diamine

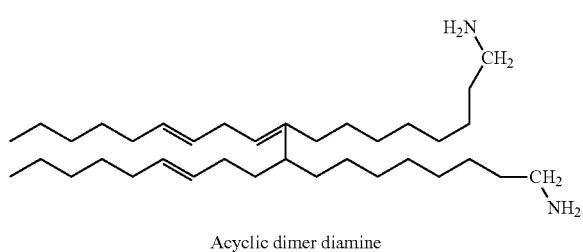

Acyclic dimer diamine

The suspension agent imparts to the gravel pack fluid the ability to suspend gravel even though the viscosity of the fluid is relatively low. The viscosity of the fluid is less than 100 cp, and preferably less than 40 cp. This suspension agent also eliminates the need to break the emulsion during flow-back since it has such lower viscosity values. The gravel will typically have a U.S. mesh size of between about 20/40 and 40/70.

The invert emulsion carrier fluid of the invention should preferably be compatible with typical oil based mud and mud additives used in drilling, so that no thick emulsions or sludges are formed that could damage formations and decrease well production. Thus, for example, in one embodiment, the oil phase of the invert emulsion carrier fluid comprises the same type of oil as used in the oil based drilling mud. Therefore, in such embodiment for nonlimiting example, synthetic oil will be preferably used for the carrier fluid if the well was drilled with a synthetic oil based drilling mud. The oil of the emulsion as noted previously can be either synthetic oil or naturally occurring oil.

In addition, the fluid of the invention should have an acceptable health, safety, and environmental profile. The dimer diamine (or fatty acid dimer diamine) and polyurea components comprising the suspension agent are environmentally compatible. Polyurea shows a biodegradability of 71.4% in 42 days and fatty acid dimer diamine shows a biodegradability of 66.5% in 28 days and 82.1% in 35 days. Fatty acid dimer diamine also shows low ecotoxicity to the marine juvenile fish Cyprinodont varieties often used for environmental tests.

Optionally, the carrier fluid of the invention can further contain one or more additives such as surfactants, corrosion inhibitors, salts (e.g., potassium chloride), anti-foam agents, scale inhibitors, additional emulsifiers (at between about 0.5 and 3 wt % of the carrier fluid), organophilic clays and bactericides.

For gravel packing, gravel is carried by the carrier fluid of the invention into the wellbore site for gravel packing. The emulsions will inevitably contact drilling mud or drilling fluid used in the well, and as noted above, the natural or synthetic oil comprising the emulsion should preferably be compatible with the natural or synthetic oil in the drilling mud. Best results are expected to be obtained when the emulsions are used in gravel packing where the gravel is being continuously deposited during the packing operation. This method may also be used for well treatments requiring deposits of particulates other than gravel. In one embodiment, such particulates may typically have an average particle size in the range of about 200 U.S. mesh to about 4 U.S. mesh and/or a density in the range of about 0.5 g/cc to about 4.5 g/cc.

Specific techniques and conditions for pumping a gravel pack composition into a well are known to persons skilled in this field. The conditions which can be used for gravel-packing in the present invention include pressures that are above fracturing pressure, particularly in conjunction with the Alternate Path Technique, known for instance from U.S. Pat. No. 4,945,991, and according to which perforated shunts are used to provide additional pathways for the gravel pack slurry. Furthermore, certain oil based gravel pack compositions of the present invention with relatively low volume internal phases (e.g., discontinuous phases) can be used with alpha- and beta-wave packing mechanisms similar to water packing.

In the method of the invention, the invert emulsion in the carrier fluid does not need to be broken after deposition of the gravel. That is, the fluid carries and deposits the gravel in the well and then, because of its low viscosity, readily flows back to the well surface. Any fluid that enters the formation readily mixes for production with oil being produced, without need for injection of an emulsion breaker into the well.

Experiments

The advantages of the invention are demonstrated by the following laboratory experiments.

A brine in oil invert emulsion fluid was prepared having an OWR of 70:30, using XP07™ base oil, a paraffin alkane synthetic oil available from Halliburton Energy Services, Inc. in Houston, Tex. and Duncan, Okla., and 25% calcium chloride brine. Table 2 lists the additives to four samples of the fluid and their order of addition. Once formulated, 200 ml of each fluid sample was placed in an aging cell and pressurized to 100 psi. The fluid samples were then hot rolled in a roller oven at 250° F. for 2 hours, after which they were cooled in a water bath for 30 minutes. The fluid samples were then poured from the aging cell to mixing cups. To each of those cups, 96 gms of size 20-40 CARBO LITE® sand (available from Carbo Ceramics, Inc. in Houston, Tex. and Halliburton Energy Services, Inc. in Houston, Tex. and Duncan, Okla., were added and mixed well for 5 minutes using a multimixer. The contents of the cups were then transferred into 100 ml measuring cylinders and after 90 minutes, the extent of sand settling and oil separation in each was recorded. The fluid viscosities were also measured and are reported in Table 2. All trademarked products in Table 2 are available from Halliburton Energy Services, Inc. in Houston, Tex. and Duncan, Okla., except that XP-07™ is available from ExxonMobil in Houston, Tex. and CARBO LITE® sand is also available from Carbo Ceramics, Inc. in Houston, Tex.

TABLE 2

Mixing Order of Additives and Fluid Formulations

| 70:30 OWR Composition, Total 200 ml emulsion | Mixing time, min | Fluid 1 | Fluid 2 | Fluid 3 | Fluid 4 |
|---|---|---|---|---|---|
| XP-07 ™ oil, ml | — | 140 ml | 140 ml | 140 ml | 140 ml |
| EZ MUL NT ™ emulsifier, g | 2 | 7 | 7 | 7 | 10 |
| Lime, g | 2 | 1.5 | 1.5 | 1.5 | 1.5 |
| BDF 566 ™ polyurea, g | 5 | 3 | — | 3 | 3 |
| 25% $CaCl_2$ brine, ml | 5 | 60 ml | 60 ml | 60 ml | 60 ml |
| BDF 570 ™ dimer diamine, g | 5 | — | 3 | 3 | 3 |
| 20-40 CARBO LITE ® sand, g | 5 | 96 gm | 96 gm | 96 gm | 96 gm |
| Initial fluid density (without sand), ppg | | 7.5 | 7.5 | 7.5 | 7.5 |
| Final density, (with 20-40 CARBO LITE ® sand), ppg | | 10 | 10 | 10 | 10 |
| Viscosity, cp@ 300 rpm on Fann 35, i.e. 511 $s^{-1}$ | | 20 | 10 | 22 | 36 |
| Oil separation after 30 min | | 12 | 17 | 4 | 2 |
| Sand Suspended | | No | No | Yes | Yes |

The first fluid sample, Fluid 1 in Table 2, was formulated with polyurea as a suspension agent, without any dimer diamine. The viscosity of the fluid after hot rolling at 250° F. was 20 cp when measured on a FANN 35 rheometer at 300 rpm. Sand settling was observed immediately after pouring the contents from the mixing cup into the 100 ml measuring cylinder.

The second fluid sample, Fluid 2 in Table 2, was formulated using a C36 fatty acid dimer diamine as a suspension agent, in the absence of polyurea. The viscosity of the fluid after hot rolling the fluid at 250° F. was 10 cp when measured on a FANN 35 rheometer at 300 rpm. Sand settling was observed immediately after pouring the contents from the mixing cup into the 100 ml measuring cylinder.

The third fluid sample, Fluid 3 in Table 2, was formulated according to the invention, with a suspension agent comprising both polyurea and C36 fatty acid dimer diamine. The viscosity of the fluid was 22 cp, after hot rolling the fluid at 250° F. when measured on a FANN 35 rheometer at 300 rpm. The fluid held the sand in suspension and after 90 minutes of settling time in the measuring cylinder was still able to hold the 20-40 Carbolite sand in suspension. Thus, even with a low viscosity of 22 cp, no sand settling was observed.

The fourth fluid sample, Fluid 4 in Table 2, was also formulated according to the invention, with a suspension agent comprising both polyurea and C36 fatty acid dimer diamine, but with a higher emulsifier concentration (10 g instead of 7 g of EZ MUL® NT emulsifier, available from Halliburton Energy Services, Inc. in Houston, Tex. and Duncan, Okla.) than used with the other fluid samples. The final viscosity of the hot rolled fluid was 36 cp. Increasing the emulsifier concentration helped to stabilize the emulsion, thereby minimizing oil separation and providing good sand suspension. Even with this still relatively low viscosity for a gravel packing fluid, Fluid 4 showed good gravel suspension characteristics. This fluid sample also showed an oil separation of 2 ml after 30 minutes and that separation remained the same—did not increase—after six hours.

The foregoing description of the invention is intended to be a description of preferred embodiments. Various changes in the details of the described fluids and methods of use can be made without departing from the intended scope of this invention as defined by the appended claims.

What is claimed is:

1. A method of gravel packing a wellbore penetrating a subterranean formation, comprising:
   (a) injecting into the wellbore a gravel pack composition comprising gravel and a carrier fluid comprising an invert emulsion and a suspension agent comprising polyurea and dimer diamine, such that the carrier fluid is a carrier for the gravel; and
   (b) depositing said gravel on the sides of said wellbore until said gravel packing of said wellbore is complete.

2. The method of claim 1 wherein the dimer diamine in the suspension agent of the carrier fluid is a C36 fatty acid dimer diamine.

3. The method of claim 1 wherein the carrier fluid has a viscosity less than 100 cp.

4. The method of claim 3 wherein the carrier fluid has a viscosity less than 40 cp.

5. The method of claim 1 further comprising allowing the carrier fluid to flowback to a well surface after deposition of the gravel, wherein the emulsion in the carrier fluid is not broken during the flowback.

6. The method of claim 1 wherein the polyurea in the carrier fluid has a concentration in the range of about 1 to about 20 ppb.

7. The method of claim 1 wherein the dimer diamine in the carrier fluid has a concentration in the range of about 1 to about 20 ppb.

8. The method of claim 1 wherein the invert emulsion of the carrier fluid comprises a brine comprising salt selected from the group consisting of: potassium chloride, ammonium chloride, tetramethyl ammonium chloride, and any combination thereof.

9. The method of claim 1 wherein the invert emulsion is the same as or compatible with a fluid for drilling the wellbore.

10. The method of claim 1 wherein the carrier fluid has a density in the range of about 8.8 ppg to about 19.2 ppg.

11. A method of treating a portion of a wellbore with a particulate, the method comprising the steps of:
   (a) preparing or providing a carrier fluid comprising:
      (i) an oleaginous continuous phase;
      (ii) a discontinuous phase
      (iii) a suspension agent comprising polyurea and dimer diamine, and
      (iv) a solid particulate; and
   (b) introducing the carrier fluid into a well.

12. The method of claim 11 wherein the solid particulate has an average particle size in the range of about 200 U.S. mesh to about 4 U.S. mesh.

13. The method of claim 11 wherein the solid particulate has a density in the range of about 0.5 g/cc to about 4.5 g/cc.

* * * * *